US011961694B2

(12) United States Patent
Flachenecker

(10) Patent No.: US 11,961,694 B2
(45) Date of Patent: Apr. 16, 2024

(54) FIBER-OPTIC COMMUNICATION FOR EMBEDDED ELECTRONICS IN X-RAY GENERATOR

(71) Applicant: Carl Zeiss X-ray Microscopy, Inc., Dublin, CA (US)

(72) Inventor: Claus Flachenecker, Hayward, CA (US)

(73) Assignee: Carl Zeiss X-ray Microscopy, Inc., Dublin, CA (US)

( * ) Notice: Subject to any disclaimer, the term of this patent is extended or adjusted under 35 U.S.C. 154(b) by 199 days.

(21) Appl. No.: 17/238,811

(22) Filed: Apr. 23, 2021

(65) Prior Publication Data

US 2022/0346213 A1 Oct. 27, 2022

(51) Int. Cl.

| | |
|---|---|
| ***H01J 35/02*** | (2006.01) |
| ***H05G 1/06*** | (2006.01) |
| ***H05G 1/30*** | (2006.01) |
| *H05G 1/32* | (2006.01) |
| *H05G 1/34* | (2006.01) |
| *H05G 1/52* | (2006.01) |
| *H05G 1/56* | (2006.01) |

(52) U.S. Cl.

CPC ............. *H01J 35/025* (2013.01); *H05G 1/06* (2013.01); *H05G 1/30* (2013.01); *H05G 1/32* (2013.01); *H05G 1/34* (2013.01); *H05G 1/52* (2013.01); *H05G 1/56* (2013.01)

(58) Field of Classification Search

CPC ........... H01J 35/025; H05G 1/06; H05G 1/34; H05G 1/52; H05G 1/30

See application file for complete search history.

(56) References Cited

U.S. PATENT DOCUMENTS

| | | | | |
|---|---|---|---|---|
| 2,559,526 A | | 7/1951 | Graaff et al. | |
| 4,352,021 A | * | 9/1982 | Boyd | H05G 1/70 378/146 |
| 6,212,256 B1 | * | 4/2001 | Miesbauer | H05G 1/26 378/207 |
| 6,885,728 B2 | | 4/2005 | Hadland et al. | |

(Continued)

FOREIGN PATENT DOCUMENTS

| | | |
|---|---|---|
| CN | 104 020 184 B | 3/2017 |
| DE | 732 038 C | 2/1943 |

(Continued)

OTHER PUBLICATIONS

European Partial Search Report, completed on Sep. 29, 2022, from European Application No. EP 22 16 9521.9, filed on Apr. 22, 2022. 72 pages.

(Continued)

*Primary Examiner* — Chih-Cheng Kao
(74) *Attorney, Agent, or Firm* — HoustonHogle LLP

(57) ABSTRACT

An x-ray source includes an optical communications link to provide a galvanically isolated communication between a system controller and a gun controller. In specific examples, the link is provided through one or more fibers. In addition, the gun controller is preferably remote programmed by the system controller during startup. This addresses the problem of reprogramming a processor in a hard to access location/environment. A watchdog timer is also useful for the gun digital processor of the gun controller.

2 Claims, 4 Drawing Sheets

(56) References Cited

U.S. PATENT DOCUMENTS

| | | | | |
|---|---|---|---|---|
| 9,524,845 | B2 | 12/2016 | Boye et al. | |
| 9,748,070 | B1 | 8/2017 | Wall | |
| 9,941,090 | B2 | 4/2018 | Hadland | |
| 10,701,788 | B2 | 6/2020 | Sakabe et al. | |
| 10,923,307 | B1 | 2/2021 | Yabushita et al. | |
| 2002/0085676 | A1 | 7/2002 | Snyder | |
| 2002/0181654 | A1* | 12/2002 | Baertsch | H05G 1/30 378/98 |
| 2004/0076260 | A1 | 4/2004 | Charles, Jr. et al. | |
| 2004/0114712 | A1 | 6/2004 | Eppler et al. | |
| 2004/0190675 | A1 | 9/2004 | Birdwell et al. | |
| 2006/0171506 | A1 | 8/2006 | Lovoi et al. | |
| 2007/0053495 | A1 | 3/2007 | Morton et al. | |
| 2008/0123815 | A1* | 5/2008 | Feda | G01N 23/223 378/112 |
| 2009/0086917 | A1 | 4/2009 | Warburton et al. | |
| 2010/0020937 | A1 | 1/2010 | Hautmann et al. | |
| 2012/0269326 | A1 | 10/2012 | Adler et al. | |
| 2014/0050305 | A1 | 2/2014 | Zhao et al. | |
| 2014/0140486 | A1 | 5/2014 | Yanagisawa et al. | |
| 2014/0161232 | A1 | 6/2014 | Jeong et al. | |
| 2014/0294150 | A1 | 10/2014 | Tamura et al. | |
| 2015/0117616 | A1 | 4/2015 | Ishii et al. | |
| 2016/0196950 | A1 | 7/2016 | Ishihara et al. | |
| 2016/0336140 | A1* | 11/2016 | Nonoguchi | H01J 35/025 |
| 2017/0004950 | A1 | 1/2017 | Nonoguchi | |
| 2017/0110283 | A1 | 4/2017 | Shirota et al. | |
| 2017/0318651 | A1* | 11/2017 | Canfield | A61B 6/584 |
| 2017/0372865 | A1 | 12/2017 | Ishihara et al. | |
| 2018/0033582 | A1 | 2/2018 | Hadland | |
| 2018/0352638 | A1* | 12/2018 | Guo | A61B 6/547 |
| 2019/0069384 | A1* | 2/2019 | Ando | H05G 1/54 |
| 2020/0154552 | A1* | 5/2020 | Suzuki | H05G 1/32 |

FOREIGN PATENT DOCUMENTS

| | | | |
|---|---|---|---|
| EP | 2763156 | A1 | 8/2014 |
| FR | 943992 | A | 3/1949 |
| JP | H09117450 | A | 5/1997 |
| JP | 2002042705 | A | 2/2002 |
| JP | 2010 027446 | A | 2/2010 |
| JP | 2010244834 | A | 10/2010 |
| JP | 2014229596 | A | 12/2014 |
| JP | 5945337 | B2 | 7/2016 |
| KR | 2020 0129300 | A | 11/2020 |
| WO | WO 2018/066135 | A1 | 4/2018 |
| WO | WO 2020177775 | A2 | 9/2020 |

OTHER PUBLICATIONS

European Partial Search Report, completed on Oct. 4, 2022, from European Application No. EP 22 16 9599.2, filed on Apr. 22, 2022. 29 pages.

European Search Report, completed on Dec. 22, 2022, from European Application No. EP 22169521.6, filed on Apr. 22, 2022. 110 pages.

European Search Report, completed on Jan. 12, 2023, from European Application No. EP 22169597.6, filed on Apr. 22, 2022. 21 pages.

European Search Report, completed on Dec. 13, 2022, from European Application No. EP 22169599.2, filed on Apr. 22, 2022. 71 pages.

European Partial Search Report, completed on Sep. 9, 2022, from European Application No. EP 22 16 9597.6, filed on Apr. 22, 2022. 15 pages.

* cited by examiner

FIBER-OPTIC COMMUNICATION FOR EMBEDDED ELECTRONICS IN X-RAY GENERATOR

RELATED APPLICATIONS

This application is related to:

U.S. application Ser. No. 17/238,785 filed on an even date herewith, entitled "X-ray source with liquid cooled source coils," invented by Claus Flachenecker and Thomas A. Case, now U.S. Patent Publication No.: US 2022/0346211 A1; and U.S. application Ser. No. 17/238,799 filed on an even date herewith, entitled "Method and system for liquid cooling isolated X-ray transmission target," invented by Claus Flachenecker, Bruce Borchers, and Thomas A. Case, now U.S. Patent Publication No.: US 2022/0346212 A1.

All of the afore-mentioned applications are incorporated herein by this reference in their entirety.

BACKGROUND OF THE INVENTION

X-rays are widely used in microscopy because of their short wavelengths and ability to penetrate objects. Typically, the best source of the x-rays is a synchrotron, but these are expensive systems. So, often so-called tube or laboratory x-ray sources are used in which a generated electron beam bombards a target. The resulting x-rays include characteristic line(s) determined by the target's composition and broad bremsstrahlung radiation.

There are a few basic configurations for X-ray microscopy systems. Some employ a condenser to concentrate the x-rays onto the object under study and/or an objective lens to image the x-rays after interaction with the object. The resolution and aberrations associated with these types of microscopes are usually determined by the spectral characteristics of the x-rays. Some microscopy systems employ a projection configuration in which a small x-ray source spot is used often in conjunction with geometric magnification to image the object.

Performance and particularly resolution are affected by different factors. Because the projection configuration does not have aberrations, the resolution is typically determined by the size of the x-ray source spot. Ideally, the x-ray source spot would be a point spot. In practice, the x-ray source spot is considerably larger. Generally, the source spot size is determined by the electron optics and the ability of those optics to focus the electron beam down to a point. Source spot sizes are generally around 50-200 micrometers (μm) with good electron optics; although in other examples x-ray-source spot size may be 1-5 millimeters (mm) when power is a more important figure of merit. For transmission-target x-ray sources, spot sizes of a few micrometers are common, such as 1 μm to 5 μm. In fact, some transmissions sources have spot sizes down to 150 nanometers (nm). In any event, x-ray-source sizes will generally limit the resolution of an x-ray projection microscope.

For many microscopy applications, a transmission-target x-ray source is often used. In the basic configuration of an X-ray tube, thermionic or field emission electrons are generated at a cathode (filament) in a vacuum tube and accelerated to an anode (forming an electron beam which is shaped by different electro static and (electro-) magnetic optical elements. For example, magnetic lenses often use coils of copper wire inside iron pole pieces. A current through the coils creates a magnetic field in the bore of the pole pieces. Electrostatic lenses employ a charged dielectric to create an electrostatic field. The electron beam then strikes the typically thin target at its backside. Common target materials are tungsten, copper, and chromium. Then x-rays emitted from the target's front side are used to irradiate the object.

An x-ray source typically requires control electronics that regulate, control and/or monitor the electron emission system (or electron "gun"). These electronics are often called a "gun controller".

The gun controller is electrically attached to the electron gun components, such as the filament, suppressor cathode (s), extraction cathode(s), and others.

In many designs, during operation, the gun electronics get elevated to a high voltage potential of many kilovolts, and a galvanic isolation needs to be provided. This arises because electrons are accelerated toward the more positive electrode (anode). If the target needs to be close to the sample, then it also needs to be grounded to avoid arcing to the sample. As a result, the filament needs to be at a high negative voltage. And, now the gun controller also needs to be at a very high negative voltage.

Typically, the gun control electronics are also either potted in epoxy or submersed in transformer oil. In any case, the gun control electronics are located in a place that is hard or impossible to reach for service personnel.

SUMMARY OF THE INVENTION

More complex gun controllers need a more intelligent control system that employs digital control through digital processors such as central processing units (CPUs), digital signal processors (DSPs), or field programmable gate arrays (FPGAs). All of these digital control subsystems need to be programmed and if possible also re-programmed "in the field." Since they are typically located in a physically inaccessible high-voltage environment, this needs to be achieved remotely through the galvanic isolation provided for that high-voltage environment.

The present invention involves an optical communications link to provide galvanically isolated communication between a system controller and the gun controller. In specific examples, the link is provided through one or more optical fibers.

In this implementation, each fiber can transmit one or multiple signals together and encode those signals through a special communication protocol. Even bidirectional optical communication over a common optical fiber can be employed.

The main advantage is the versatility of the communication method and the fact that only one or two fibers are required in total, to carry a practically unlimited number of signals in each direction. Specific protocols include Gbit ethernet over the one or more optical fibers.

The invention also involves a digital control system and remote programming of the gun controller. A gun digital processor of the gun controller requires some sort of configuration to function. Typically, this configuration is a program (for CPUs and DSPs) or a configuration file (for FPGAs) and is stored in non-volatile memory close to the processor. Upon power-up, the program or configuration file gets loaded and executed by the digital processor. Sometimes the information is stored directly inside the processing chip, and sometimes it is stored on attached memory (such as Flash memory).

The only disadvantage of this typical set-up is the fact that the gun controller may operate in a harsh x-ray environment, which makes the use of Flash memory very risky. Ongoing x-ray bombardment will slowly erase the memory and make it unreliable. It would be better if the program could be loaded "on the fly".

In the present approach, the gun controller includes a gun digital processor, and the system controller provides a configuration for the digital processor upon power-up. In this way, the operation of the digital processor is not prejudiced by the long-term radiation around the gun controller.

The configuration can be supplied over the optical fiber link. The one or more fibers of the link thereafter are preferably used to continually send data to the gun controller. Another or the same fibers can carry information from the gun controller back to the main system digital controller. This includes all the desired telemetry data, like digitized voltages, currents, temperatures, etc.

The invention also involves a watchdog timer for the gun digital processor. If no communication takes place for a certain time, the gun digital processor gets reset. This allows re-programming of the processor at any time.

In general, according to one aspect, the invention features an x-ray source comprising a system controller, a target, an electron source for generating electrons to form a beam to strike the target to produce x-rays, a high voltage generator for accelerating the beam, and a gun controller for controlling the electron source and receiving configuration from the system controller upon each startup.

The source may comprise source coils that are controlled by the gun controller.

The gun controller can include a field programmable gate array (FPGA) and the system controller provides a configuration file for the digital processor upon power-up. In other cases, the gun controller includes a central processing unit (CPU) or digital signal processor (DSP) and the system controller provides a program for the digital processor upon power-up.

An optical communications link can be used between the system controller and the gun controller over which the system controller provides the configuration to the gun controller. This optical communications link might include at least a downlink fiber for transmitting data from the system controller to the gun controller and at least an uplink fiber for transmitting data from the gun controller to the system controller.

In examples, the optical communication link encodes detected voltages of the gun controller as the frequency of light pulses. Often, the link includes at least a downlink fiber for transmitting data from the system controller to the gun controller and at least an uplink fiber for transmitting data from the gun controller to the system controller.

The gun controller might be or comprise a field programmable gate array (FPGA) or complex programmable logic device (CPLD) and the system controller provides a configuration file for the digital processor upon power-up. However, the gun controller could also be a central processing unit (CPU) or digital signal processor (DSP) and the system controller provides a program for the digital processor upon power-up.

In general, according to still another aspect, the invention features an x-ray source comprising a system controller, a target, an electron source for generating electrons to form a beam to strike the target to produce x-rays, a high voltage generator for accelerating the beam, and a gun controller for controlling the electron source and the formation of the beam under the control of the system controller. The gun controller includes a digital processor and a watchdog timer for resetting the digital processor after a period of no response.

In operation, the watchdog timer receives a keep-alive signal from the system controller and resets the digital processor after failing to receive the keep-alive signal.

In general, according to still another aspect, the invention features an x-ray source comprising a system controller, a target, an electron source for generating electrons to form a beam to strike the target to produce x-rays, a high voltage generator for providing acceleration of the beam, and a gun controller for controlling the electron source. An optical fiber link is used for enabling communications between the system controller and the gun controller.

In general, according to still another aspect, the invention features an x-ray source comprising a target, a system controller for monitoring a target current of the target, an electron source for generating electrons to form a beam to strike the target to produce x-rays, a high voltage generator for powering the electron source under the control of the system controller, source coils for steering the beam, and a gun controller for controlling the electron source and the source coils and receiving target current information that is used for controlling the source coils.

In general, according to still another aspect, the invention features an x-ray source comprising a target, a system controller for monitoring a target current of the target, an electron source for generating electrons to form a beam to strike the target to produce x-rays, a high voltage generator for accelerating the beam, a gun controller for controlling the electron source and including an analog interface unit for digitizing parameters for the gun controller and generating analog control signals.

In general, according to still another aspect, the invention features a gun controller for controlling the electron source and monitoring a power supply for the gun controller to control the operation of the power supply.

In general, according to still another aspect, the invention features a gun controller for monitoring a current to the electron source.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
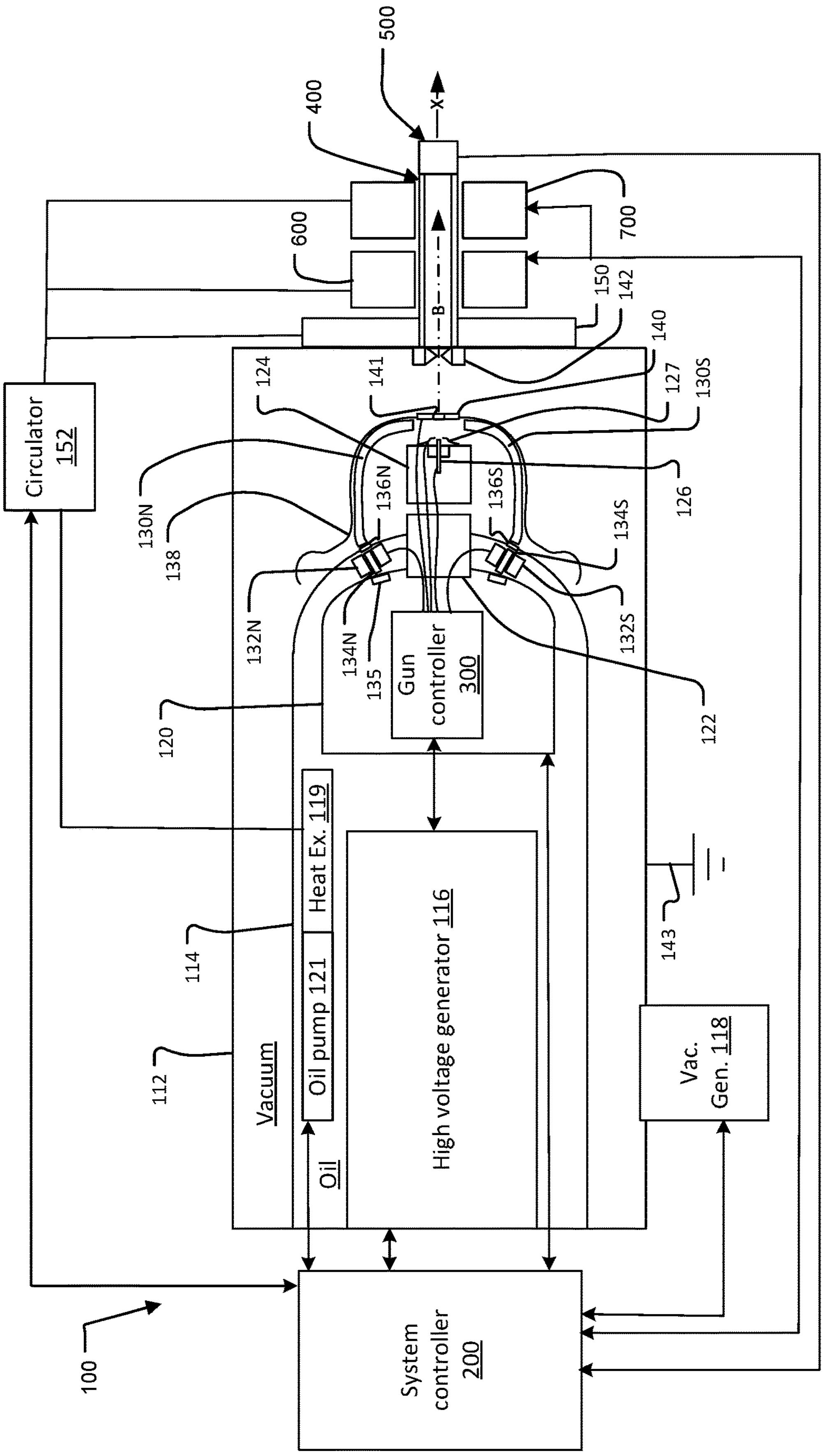
FIG. 1 is a schematic cross-sectional view of an x-ray source according to the present invention.

FIG. 1 is a schematic cross-sectional view of an x-ray source 100, which has been constructed to the principles of the present invention.

The illustrated embodiment is a "transmission-target" source. The electron beam B strikes a target of the target assembly 500 and the x-rays X, which are emitted from the opposite side of the target, are used for illuminating an object. That said, many aspects of the following innovations are equally applicable to other x-ray tube source configurations including side-window, rotating anode, and metal-jet anode.

In general, the x-ray source comprises a vacuum vessel 112 and an oil vessel 114 arranged within the vacuum vessel. Preferably, the vacuum vessel 112 is metal, such as aluminum or stainless steel, for strength against the vacuum. The oil vessel 114 is preferably constructed from a non-conductive material such as ceramic, e.g., sintered alumina, providing electrical insulation to prevent arcing to the high voltage components that it contains.

A vacuum generator 118 is used to draw and/or maintain a vacuum on the vacuum vessel 112. In one example, an ion pump is used.

Arranged inside the oil vessel is a heat exchanger 119. For this purpose, a plate heat exchanger can be used to remove thermal energy (heat) from the oil to coolant, such as water, that is circulated through the exchanger. Some embodiments further employ an oil submersible pump 121 to circulate oil within the oil vessel 114. In preferred embodiments, a circulator 152 is used to flow coolant through the heat exchanger 119 and to carry away heat from the oil.

Generally, the vacuum vessel 112 defines a volumetric evacuated region through which the electron beam B propagates from the electron emitter 126 (filament or cathode), typically located near the distal end of the oil vessel 114 to the target held by the target assembly 500. The evacuated region also preferably surrounds at least a portion of the oil vessel that contains the high voltage components to provide high-voltage insulation.

A system controller 200 is located outside both vessels 112, 114. This contains the main controller and the data interfaces to external devices. It also contains the power supply for connection to a main electricity supply. In addition, it controls the vacuum generator 118 and the circulator 152.

A high voltage generator 116 is located in the oil vessel 114. Its base is at the proximal side of the oil vessel 114, allowing it to receive power from the system controller 200. The high voltage generator 116 is immersed in the oil contained in the oil vessel 114 for thermal control and high-voltage insulation. The oil is mostly required to make the generator 116 relatively small. The generator 116 could also be potted, however. Moving distally, the high voltage generator 116 is further electrically isolated from the environment by the oil and the surrounding vacuum of the vacuum vessel 112.

The high voltage generator 116 in a current example generates a negative 20-160 kV acceleration voltage and provides power for the gun controller 300 that controls the electron source (emitter or filament) among other things. The high voltage generator biases the entire gun controller to this large negative voltage so that generated electrons will accelerate toward less negative voltages and ground.

An inner vessel 120 is located distally of the distal end of the high voltage generator 116. The inner vessel 120 is immersed in the oil of the oil vessel 114. In the current embodiment, the inner vessel is preferably constructed from a metal such as aluminum and soft iron. It is also filled with oil, which helps with transfer of heat from the electronics, as well as heat from the source coils, which will be explained later.

A gun controller 300 is housed within the inner vessel 120, which also functions as a Faraday cage to electrically protect the controller 300. It drives the electron emitter and provides control for electron emitter, beam generation, regulation and steering.

An electron emitter e.g., filament, 126 is held in a filament mount 124. In a current example, the electron emitter 126 includes a Lanthanum Hexaboride ($LaB_6$) crystal and a carbon heater rod. It projects into the vacuum of the vacuum vessel to function as a thermionic source or electron emitter (cathode). Other configurations are possible, such as W, $CeB_6$, HfC and carbon-nanotube filaments.

A vacuum feedthrough 122 provides electrical connections between the gun controller 300 in the inner vessel 120, through the oil contained in the oil vessel 114 and its outer wall.

A suppressor electrode or Wehnelt cap 127 is mounted to the distal side of the filament mount 124 and covers the filament 126. The electrons emitted from the filament 126 pass through a central aperture of the suppressor electrode 127. Its voltage is controlled by the gun controller 300.

A protective field cap 138 has a general bell shape, extending over the electron emitter 126 and its filament mount 124 and wrapping back to the distal end of the oil vessel 114. Its distal end carries a first or extractor anode 140. The voltage of the first anode and also the cap is controlled by the gun controller 300 to accelerate the emitted electrons into the beam B and through a center aperture 141 of the first anode 140. Thus, in operation, the electron beam passes through the center aperture 141 of the first anode 140.

The first anode is not necessary, however. The system could also be designed without this first anode and rely on other means to accelerate the electrons.

The beam B is directed through an aperture of a flight tube aperture assembly 142 in a distal wall of the vacuum vessel 12. This flight tube aperture assembly functions as a second anode and is currently held at a ground potential 143. Thus, with the gun controller being biased to a large negative voltage, the electrons are further accelerated in the gap between the first anode 140 and the flight tube assembly 142.

On the other hand, in other embodiments, the light tube aperture assembly 142 is electrically isolated from the vacuum vessel 112 with an insulating gasket, such as diamond. And, a voltage generator is added to supply a controlled potential to the flight tube aperture assembly. In this configuration, the system controller 200 also controls the voltage of this second anode to provide further control of, such as further acceleration to, the electron beam B. A flight tube assembly 400 extends the vacuum to the target assembly 500 at its target. A flight tube manifold 150 provides liquid cooling to the target assembly through the flight tube assembly walls with coolant, such as water, from the circulator 152.

Along the flight tube assembly 400 is arranged a flight tube beam steering and shaping system 600 to condition the electron beam and guide the beam to an arbitrary position on the target. This is done by the flight tube assembly 400 and beam steering and shaping system 600 which directs the electron beam B through a magnetic focus lens 700 at a desirable angle and location. In general, the beam steering locates the spot on different positions on the target as the target is consumed during operation.

Further along the flight tube assembly 400 is arranged the magnetic focus lens 700 to focus the beam B on the target.

Preferably, both the flight tube beam steering and shaping system 600 and the magnetic focus lens 700 are cooled by coolant circulated from the circulator 152 and controlled by the system controller 200.

A set of source coils 132N, 132S, not shown (before and behind image plane): 132E, 132W and their respective cores 134N, 134S, not shown: 134E and 134W are integrated with the oil vessel 114, gun controller inner vessel 120 and protective field cap 138. The coils are located outside the vacuum of the vacuum vessel. In one example, they could be located on an outer wall of the vacuum vessel, exposed to the ambient atmosphere. In the illustrated example, source coils 132N, 132S, 132E, 132W are located in the oil vessel and thus efficiently cooled by the contained oil, although the coils could instead be potted.

More generally oil could be replaced with potting material or any other high voltage compatible cooling material, such as Fr-77 by Sigma Aldrich, Sf6-Novec 4710 by 3M, or C3F7CN.

In more detail, two source coils 132N, 132S are generally located above and below the filament 126. Two additional source coils 132E, 132W are located at the other two axes below and above, respectively, the plane of the drawing. A north pole piece 130N and a south pole piece 130S extend respectively from the cores 134N and 134S of the source coils 132N, 132S, wrapping around the inner side of the protective field cap 138 to converge above and below the center aperture 141 of the first anode 140, respectively. And, in a similar vein, an east pole piece 130E and a west pole piece 130W (at the other two axes below and above, respectively, the plane of the drawing) extend from the cores 134E and 134W of the source coils 132E, 132W, also wrapping around the inner lateral sides of the protective field cap 138 to converge to the left and right of the center port 141, respectively, thus forming a magnetic circuit surrounding the emitter in vacuum.

The pole pieces 130N, 130S, 130E and 130W could be mechanically connected to virtually anything in the emitter region. Thus, while they are carried by the protective field cap in the illustrated embodiment, they do not need to be directly connected. That said, in the current example, the pole pieces 130N, 130S, 130E and 130W are connected to the protective cap, which is electrically at the potential of the first anode 140.

An annular, ring-shaped yoke 135 is located on the proximal side of the cores 134N, 134S, 134E and 134W and is fabricated as part of the vessel 120 to improve the magnetic circuit. In fact, in a current embodiment, the distal end of the inner vessel 120 is soft iron and thus completes the magnetic circuit by guiding the magnetic flux between the cores.

In the preferred embodiment, the magnetic circuit for the source coils 132N, 132S, 132E, 132W is further improved with magnetizable or ferromagnetic wall plugs 136N, 136S, 136E, 136W. These wall plugs are inserted into holes formed in the oil vessel 114 that are opposite the distal ends of the respective cores 134N, 134S, 134E and 134W. This improves the magnetic flux through the circuit. Specifically, the plugs minimize the gap between the coil cores 134N, 134S, 134E and 134W and the respective pole pieces 130N, 130S, 130E and 130W.

Possibly, the plugs 136N, 136S, 136E, 136W are inserted into holes that were previously drilled into the ceramic oil vessel 114. The same alternatively can be done by welding nickel-cobalt ferrous alloy or soft iron plugs into a pre-drilled hole of the stainless steel vacuum chamber 112. Other combinations are possible as well.

In a current implementation, the source coils 132N, 132S, 132E, 132W are driven and operated in current-controlled mode by the gun controller 300. Feedback is obtained indirectly by measuring the amount of beam going through the “anode aperture” onto the target by the system controller 200 which provides this information to the gun controller. The source coils are controlled by the gun controller 300 steering the electron beam near its source and specifically steer the beam in the gap between the filament 126 and the first anode 140 to thus steer the beam as it is being initially accelerated.

It should be noted, however, in other embodiments the high voltage generator could be a separate part outside of the vacuum vessel.

Figure 2:
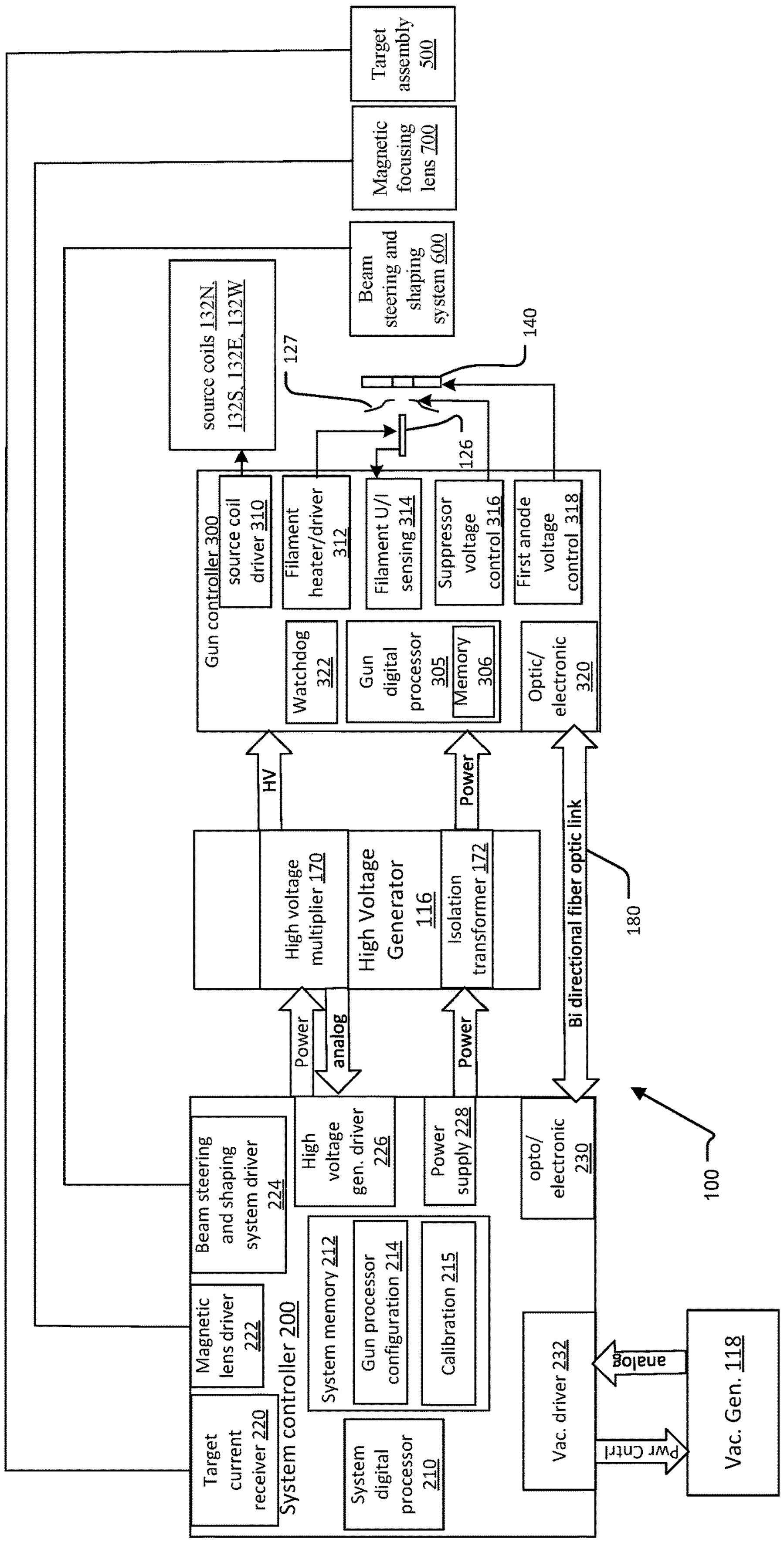
FIG. 2 is a schematic diagram showing the control of the x-ray source between the system controller and the gun controller according to the principles of present invention.

FIG. 2 shows how the control of the x-ray source 100 is distributed between the system controller 200 and the gun controller 300, and their communication, according to the principles of present invention.

The system controller 200 has a system digital processor 210 that functions as the main controller of the x-ray source 100. Typically, this is a central processing unit that receives user instructions via a digital interface such as an Ethernet (IEEE 802.3) interface to a host computer. The system digital processor 210 employs a system memory 212. This system memory stores the configuration, i.e., program, for the system digital processor as well as the gun processor configuration 214. It also typically stores the system calibration data 215.

The gun processor 305 can take a number of different forms. If the gun processor 305 is a CPU or a DSP or other type of microcontroller then the gun processor configuration 214 stored in the system memory 212 is a program including a boot program for the gun digital processor 305. On the other hand, if the gun digital processor 305 is an FPGA or CPLD, then the gun processor configuration 214 is commonly referred to as a configuration file. In any event, the configuration for the gun digital processor 305 is stored in an environment that is safe from any radiation produced by the x-ray source 100. An additional reason for sending the configuration to the gun controller each time is the on-the-fly configuration without the need of re-programming Flash memory inside the gun controller. Nevertheless, often the processor 305 also includes memory 306. In some examples, radiation shielding is added to protect this memory 306.

In addition, the system controller 200 contains a number of other drivers and monitoring devices for operating the source 100. Specifically, it includes a target current receiver 220 that detects the target current from the target assembly 500. Also included is a magnetic lens driver 222 that enables the system digital processor 210 to control the operation of the magnetic focus lens 700. In addition, a beam steering and shaping system driver 224 enables the system digital processor 210 to control the beam steering and shaping system 600. A vacuum driver 232 allows the system digital processor to provide power to the vacuum generator, e.g., ion pump, 116 to maintain the vacuum. It also receives analog feedback from that vacuum pump.

The system digital processor 210 controls the high voltage generator 116 via a high voltage generator driver 226. It also includes a power supply 228.

In the high voltage generator 216, a high voltage multiplier 170 is used to create the high voltage provided to the gun controller 300. In addition, an isolation transformer 172 provides power, received from the power supply 228, to the gun controller 300. This transformer isolates the power supply 228 of the system controller 200 from the high potentials at which the gun controller 300 operates.

In some examples, the isolation transformer 172 is not used. Instead, power is harvested from the high voltage power provided by the high voltage multiplier. The separate isolation transformer 172, however, provides the advantage that the gun controller 300 can be powered along with its gun digital processor 305 without high voltage output from the high voltage multiplier.

On the gun controller 300, the gun digital processor 305 controls the components associated with the formation of the electron beam. Specifically, a filament heater and driver 312 provides power to heat the filament 126. A filament U/I sensing module 314 monitors the operation of the filament 126 and provides feedback to the gun digital processor 305.

A suppressor voltage controller 316 controls the potential of the suppressor electrode 127. A first anode voltage controller 318 allows the digital processor 305 to regulate the voltage of the first anode 140. The gun digital processor 305 controls the steering of the electron beam via a source coil driver 310 which controls the source coils 132N, 132S, 132E, 132W.

A bidirectional fiber optic link 180 provides the communication between the system digital processor 210 of the system controller 200 and the gun digital processor 305 of the gun controller 300. The fiber optic link is maintained between the system controller optoelectronic interface 230 and the gun controller optoelectronic interface 320. Generally, the fiber optic link comprises one or more and typically two or more optical fibers. Preferably, these are multimode optical fibers but single mode fibers could be used. On the other hand, each of the optoelectronic interfaces 230, 330 comprises a transmitter including a diode laser that optically encodes information for transmission over the optical fibers. In addition, each optoelectronic interface 230, 330 includes a receiver, that is typically a photodiode, that detects the modulated light from the other laser diode to decode that light into an electronic signal for the system digital processor 210 and the gun digital processor 305.

During operation, the gun digital processor 305 reports back on the operation of the filament 126, the suppressor electrode 127, the first anode 140, and the emitter steering coils 132 to the system digital processor via the optic link 180. Generally, the gun digital processor 305 transmits status bits (over-current, system health), temperatures, supply voltages, supply currents. On the other hand, the system digital processor 210 is communicating the following information to the gun digital processor: interlock status (for emergency beam turn-off), software watchdog signal, enable-bits for all subsystems, and all the requested voltages and currents (Wehnelt, first anode 140, filament, source coils).

During a startup operation, the gun digital processor 305 receives power from the system controller via the isolation transformer 172 and immediately starts to look for configuration received over the fiber optic link 180 via its optoelectronic interface 320. As a result, during startup the system digital processor 210 reads the gun processor configuration 214 stored in its system memory 212 and forwards that to the optoelectronic interface 230 for transmission over the fiber optic link 182 to the gun digital processor 305. In a current example, the gun digital processor 305 is an FPGA and the processor 305 is set to be programmed "slave serial", which receives an asynchronous clocked configuration bitstream after reset.

Also included in the gun controller is a watchdog 322. It watches the communications over the fiber optic link for a periodic keep-alive clock signal transmitted by the system controller 200. If the watchdog 322 fails to detect the clock after a set time-out period, such as less than 5 milliseconds, the watchdog 322 resets the gun digital processor.

While in reset, the output pins of the gun digital processor 305 have a designated state. FPGAs typically pull all pins high while in reset. The gun control electronics are implemented in a way to turn the electron beam, filament heater and steering coils off while in reset.

The gun digital processor 305 controls the source coils 132N, 132S, 132E, 132W. In more detail, in the current implementation, the system digital processor 210 monitors the target current via the target current receiver 220. This target current information is used to determine the drive currents to the separate source coils 132N, 132S, 132E,

132W. These desired drive currents are then relayed to the gun digital processor 305 via the fiber optic link 180. The gun digital processor then uses these current settings to control the source coils 132N, 132S, 132E, 132W in order to steer the beam through the apertures to the target during operation.

Nevertheless, in other embodiments, the target current information is sent to the gun digital processor which then determines the drive currents for the different coils.

Figure 3:
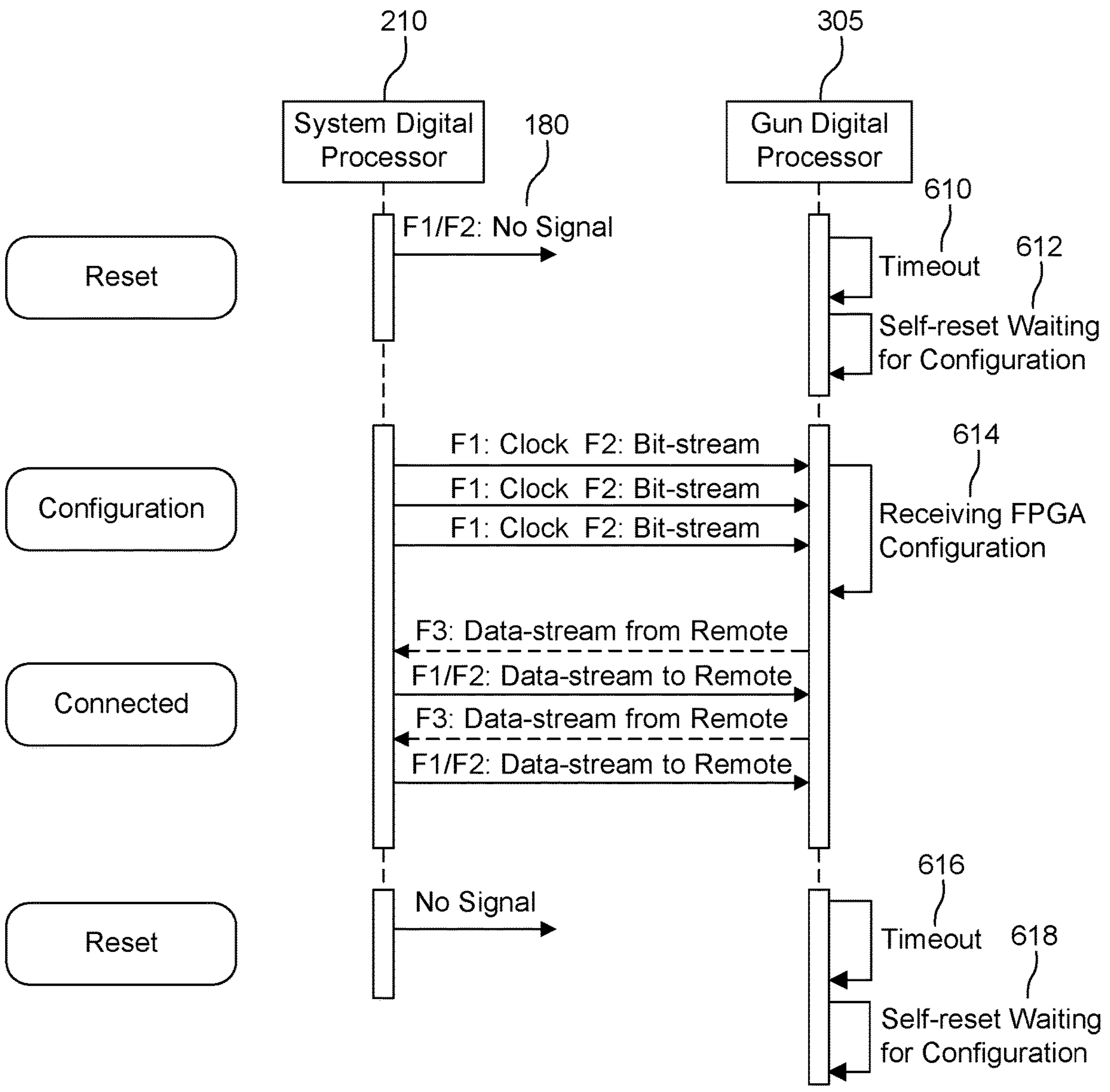
FIG. 3 is a swimlane diagram showing the operation of the system digital processor 210 and the gun digital processor 305 during reset, configuration, and operation.

FIG. 3 shows the communication between the system digital processor 210 and the gun digital processor 305.

In more detail, during reset, no communication is being sent by the system digital processor 210 to the gun digital processor 305 over the fiber optic link 180, which in the example comprises two optical fibers F1, F2. As a result, after waiting for a predetermined timeout period in step 610, such as one second, the gun digital processor 305 performs a self-reset and then waits for configuration in step 612.

During configuration, the first fiber F1 sends a clock and the second fiber F2 sends a bitstream encoding the gun configuration 214 for the gun digital processor 305. During this communication, the gun digital processor 305 receives its configuration in step 614 and then executes that configuration.

During the connected and normal operation state, fibers F1 and F2 send data streams to the gun digital processor 305 and a third fiber F3 carries the data stream from the gun digital processor 305 to the system digital processor 210 in accordance with the operation provided by the gun configuration 214.

In other examples, only one fiber is used. Instead of F1 (clock) and F2 (data), there would only be F1 at a predetermined bitrate and protocol, such as like a standard RS232 or RS485 communication.

Then, during a subsequent reset phase, if no signal is received from the system digital processor after a time out 616, the gun digital processor 305 goes through another self reset and then waits for configuration in step 618.

Figure 4:
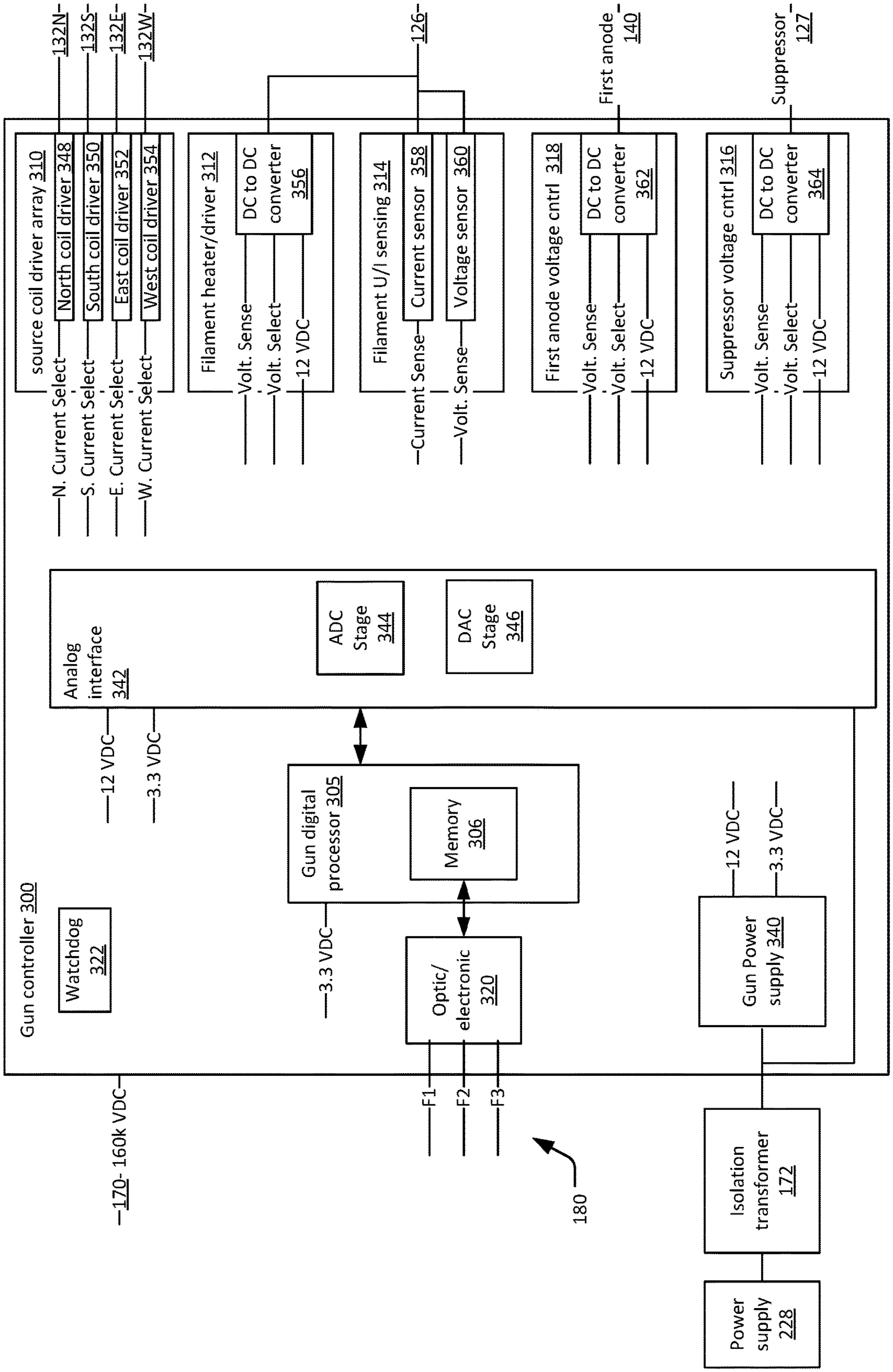
FIG. 4 is a schematic block diagram showing details of the gun controller.

FIG. 4 is a schematic block diagram showing details of the gun controller.

The bi-directional optical fiber link 180, in the illustrated example, comprises three fibers F1, F2 F3. These terminate at the optical/electronic module 320. In the current example, the system function is similar to a direct memory access in which the data from the fibers is written directly into the memory 306. At the same time, the contents of the memory are sent from the gun digital processor 305 to the system controller 200.

A gun power supply 340 receives 20 volts AC from the isolation transformer 172. It then produces 12 volts DC and 3.3 volts DC for the operation of gun controller 300.

An analog interface unit 342 functions as the interface between the gun digital processor 305 and the analog components including source coil driver array 310, the filament heater/driver 312, the filament sensing unit 314, the first anode voltage controller 318 and the suppressor voltage controller 316. Specifically, for this operation, the analog interface 342 includes a stage of several analog to digital converters 344 and a stage of several digital to analog converters 346.

The source coil driver array 310 includes a north coil driver 348 for driving the north coil 132N, a south coil driver 350 for driving the south coil 132S, an east coil driver 352 for driving the east coil 132E and a west coil driver 354 for driving the west coil 132W. Each of these coil drivers 348-354 receives a separate current select signal from the digital to analog converter stage 346. These select signals are used to set the current level for the respective driver/coil pair.

The filament heater/driver 132 includes a dc-to-dc converter 356. This receives 12 VDC from the gun power supply 340. A voltage select signal provided by the digital to analog stage 346 sets the voltage generated by the dc-to-dc converter 356 to thereby control the drive current to the filament 126.

The filament U/I sensing unit 314 includes a current sensor 358 and a voltage sensor 360. These produce a current sense signal and a voltage sense signal that are digitized by the analog to digital converter stage 344 so that the current and voltage (produced by dc-to-dc converter 356) of the filament 126 can be monitored by the gun digital processor 305. In addition, the processor 305 can now monitor the power dissipated in the filament and use that information to indirectly estimate the filament temperature.

In one example, the gun digital processor monitors the voltage across and current through the filament 126, especially over time. From this information, the resistance of the filament 126, and specifically changes in that resistance overtime, are monitored to assess the wear to and current state of the filament 126. In many examples, this information is further used to optimally control that filament in order to improve its long-term operation and operational lifetime. This can be especially helpful when tungsten filaments are used.

The first anode voltage controller 318 includes a dc-to-dc converter 362. A voltage select signal from the digital to analog stage 346 allows the gun digital processor 305 to set the voltage applied to the first anode 140. A voltage sense signal allows the gun digital processor 305 via the analog to digital converter stage 344 to monitor the actual voltage of the first anode 140.

A suppressor voltage controller 316 also includes a dc-to-dc converter 364 that generates the voltage applied to the suppressor electrode 127. A voltage sense signal allows the gun digital processor 305 via the analog to digital converter stage 344 to monitor the actual voltage of the suppressor 127.

The gun controller 300 also reads the voltage provided by the output of the isolation transformer 172 and provides feedback control to the power supply 228 of the system controller 200 to regulate the voltage to the nominal 20 VAC. As the load in the gun controller changes (by changing coil currents and heating the filament with different powers), this supply voltage also changes with the changes in load. The analog interface 342 samples the voltage from the isolation transformer 172 and reports the digitized voltage to the gun digital processor 305, which sends the voltage readings back to the system controller 200. The system controller 200 in turn regulates the power output from the power supply 228 into the isolation transformer 172 until the feedback from the gun controller 300 indicates that the gun controller's power supply is at the desired voltage.

In the current embodiment, power supply 228 implements pulse width modulation to the isolation transformer. The "on-time" during which power is delivered is changed as a function of the power demand from the gun controller 300. In more detail, the power supply 228 turns on power in positive phase of the AC for duration t1, turns off for duration t2, turns on power in negative phase for duration t1, and turns off for duration t2. The power supply controls the ratio of t1/(t1+t2) to achieve the desired output power and voltage, and (t1+t2) is controlled to achieve the desired switching frequency. At the same switching frequency, as t1 gets bigger, t2 gets smaller by the same amount.

While this invention has been particularly shown and described with references to preferred embodiments thereof, it will be understood by those skilled in the art that various changes in form and details may be made therein without departing from the scope of the invention encompassed by the appended claims.

What is claimed is:

1. An x-ray source comprising:

a system controller;

a target;

an electron source for generating electrons to form a beam to strike the target to produce x-rays;

a high voltage generator for accelerating the beam;

a gun controller for controlling the electron source and powered by the high voltage generator; and an optical fiber link for enabling communications between the system controller and the gun controller;

wherein the optical fiber link between the system controller and the gun controller includes at least a downlink for transmitting data from the system controller to the gun controller and at least an uplink for transmitting data from the gun controller to the system controller and wherein the gun controller is a central processing unit (CPU) or digital signal processor (DSP) and the system controller provides a program for the central processing unit or the digital signal processor using the optical fiber link.

2. The source of claim 1, wherein the optical fiber link between the system controller and the gun controller includes at least a downlink fiber for transmitting data from the system controller to the gun controller and at least an uplink fiber for transmitting data from the gun controller to the system controller.

* * * * *